US012441367B1

United States Patent
Howell et al.

(10) Patent No.: US 12,441,367 B1
(45) Date of Patent: Oct. 14, 2025

(54) DYNAMIC VEHICLE CONTROL

(71) Applicant: Amazon Technologies, Inc., Seattle, WA (US)

(72) Inventors: Kameron Howell, Loganville, GA (US); Shobhit Sachdeva, Seattle, WA (US); Tyler Austin Dunlevy, Chandler, AZ (US); Lohith Pingili Venkatachalam, Hyderabad (IN)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 186 days.

(21) Appl. No.: 18/143,217

(22) Filed: May 4, 2023

Related U.S. Application Data (60) Provisional application No. 63/426,943, filed on Nov. 21, 2022.

(51) Int. Cl.
*B60W 60/00* (2020.01)
*G01C 21/34* (2006.01)
*G05B 13/02* (2006.01)

(52) U.S. Cl.
CPC ... *B60W 60/00256* (2020.02); *G01C 21/3407* (2013.01); *G05B 13/027* (2013.01); *B60W 2556/50* (2020.02)

(58) Field of Classification Search
CPC ........ B60W 60/00256; B60W 2556/50; G01C 21/3407; G05B 13/027
See application file for complete search history.

(56) References Cited

U.S. PATENT DOCUMENTS

| | | | |
|---|---|---|---|
| 2007/0017984 A1* | 1/2007 | Mountz | G06Q 10/087 235/385 |
| 2007/0021864 A1* | 1/2007 | Mountz | G06Q 10/087 700/216 |
| 2016/0042314 A1* | 2/2016 | Mountz | G08C 17/02 705/28 |
| 2018/0017405 A1* | 1/2018 | Chen | H04W 4/02 |
| 2020/0249699 A1* | 8/2020 | Kim | G05D 1/0295 |
| 2021/0191407 A1* | 6/2021 | Benisch | G06N 20/00 |

(Continued)

FOREIGN PATENT DOCUMENTS

KR    20210143346    * 11/2021    ............ B60W 10/06

OTHER PUBLICATIONS

English Translation to KR20210143346 (Year: 2021).*

*Primary Examiner* — Thomas E Worden
*Assistant Examiner* — Atticus A Cameron
(74) *Attorney, Agent, or Firm* — K&L Gates LLP (57) ABSTRACT

Devices and techniques are generally described for dynamic vehicle control. In some examples, first instructions may be sent to an electronic control unit (ECU) of the vehicle effective to route the vehicle to a first destination. In some examples, a determination may be made, for a first item carried by the vehicle while the vehicle is in route to the first destination, a first number of units of the first item present at a second destination. In some examples, a first score may be determined for the second destination based at least in part on the first number of units. The second destination may be selected for re-routing the vehicle based at least in part on the first score. Second instructions effective to re-route the vehicle from the first destination to the second destination. The second instructions may be sent to the ECU of the vehicle.

20 Claims, 6 Drawing Sheets

(56) References Cited

U.S. PATENT DOCUMENTS

| | | | |
|---|---|---|---|
| 2021/0201070 A1* | 7/2021 | Omari | G01C 21/3635 |
| 2022/0321443 A1* | 10/2022 | Bajaj | H04L 1/08 |
| 2022/0327483 A1* | 10/2022 | Yang | G01C 21/3407 |
| 2023/0020135 A1* | 1/2023 | Ferguson | G08G 5/0043 |
| 2023/0278555 A1* | 9/2023 | Kim | G08G 1/096741 |
| | | | 701/41 |
| 2024/0078498 A1* | 3/2024 | Perumallla | G06Q 10/083 |
| 2024/0140491 A1* | 5/2024 | Laverne | B60W 60/00256 |
| 2024/0310178 A1* | 9/2024 | Osawa | G06Q 10/08355 |

* cited by examiner

| Vehicle 110 | Destination 1 | Destination 2 | Destination 3 | ... |
|---|---|---|---|---|
| Item ID 1234 | 0 | 21 | 18 | |
| Item ID 2345 | 314 | 6 | 16 | |
| Score | 5 | 2 | 4 | |

Quantity = 0: +5 points
0 < Quantity < 20: +2 points
Quantity ≥ 20: +0 points

DYNAMIC VEHICLE CONTROL

CROSS-REFERENCE TO RELATED APPLICATIONS

This application claims the benefit of U.S. Provisional Patent Application No. 63/426,943, filed Nov. 21, 2022, the disclosure of which is incorporated herein by reference in its entirety.

BACKGROUND

Vehicles may receive external control data to course correct and/or to route the vehicle to a desired destination. Autonomous vehicles may use computer vision, artificial intelligence algorithms, and/or sensor data to perceive their external environments and navigate within such environments. Autonomous vehicle systems may pilot such vehicles to predefined destinations according to the needs of the vehicle occupants and/or the vehicle owners.

DETAILED DESCRIPTION

In the following description, reference is made to the accompanying drawings that illustrate several examples of the technology described herein. It is understood that other examples may be utilized and various operational changes may be made without departing from the scope of the present disclosure. The following detailed description is not to be taken in a limiting sense, and the scope of the embodiments described herein is defined only by the claims of the issued patent.

In various examples, vehicle control data may be sent to vehicles with on-board network-connected computing devices and used to control one or more systems of such vehicles. For example, a cloud-based computing service (or other remote computing service) may determine an updated destination for an autonomous vehicle while the vehicle is in route to an original destination. As described in further detail below, decision logic to determine whether to re-route a vehicle based on the latest information may be computed on a continuous and/or semi-continuous basis such that the re-route of the vehicle and/or the sending of control instructions to the vehicle is based on the latest information and is optimized for one or more objectives. In some examples, an electronic control unit (ECU) of a vehicle may be configured in communication via a network interface with the remote computing service. The ECU of the vehicle may authenticate to the remote computing service by sending authentication credentials and/or performing a handshake procedure (e.g., exchanging cryptographic keys).

After successful authentication, the remote computing service may receive sensor data and/or other relevant data from the vehicle and/or from other data sources. The data may, in turn, be used to determine whether to re-route the vehicle based on a variety of factors described in further detail below. The re-route may be determined in real time as the vehicle is in route to the original destination. Upon determining that a re-route is to be performed, the remote service may generate control data that may include computer-executable navigation control instructions that may be effective to control various components and/or systems within the vehicle (e.g., a navigation system and/or an autonomous vehicle control system). The control data may be sent to the vehicle ECU and may be used to control operation of the various components and/or systems of the vehicle. In various examples, the vehicle's ECU may collect state data describing states of vehicle systems and/or sensors. The state data may be sent to the remote computing service (e.g., a serverless function) wirelessly and may be used to evaluate logic to determine the appropriate control data to push to the vehicle's ECU. The state data (e.g., location data) sent to the remote computing service from the vehicle's ECU may be encrypted to alleviate privacy concerns.

In large-scale supply and/or delivery systems the positioning and/or staging of inventory to optimize for delivery speed and/or item processing can be an extremely challenging issue. Current inventory management systems are limited in terms of dynamic decision making that can provision inventory based on real time information. In some cases, vehicles that may be delivering items to one destination (e.g., a distribution center, warehouse, etc.) may be re-routed based on a current load and/or backlog of processing at a particular destination. Currently, when such congestion occurs at a particular site vehicles that are headed to that destination may be re-routed to other destinations (e.g., via radio dispatch, etc.). However, selection of a vehicle at random to re-route to an updated destination is suboptimal in terms of optimizing for other constraints beyond site-specific processing load/backlog. Accordingly, described herein are systems that can control vehicles via electronic communication with vehicle ECU systems to re-route the vehicles in real time based on computer-implemented logic that considers not only site-processing load, but also the particular items being carried by each vehicle. Once a decision is made to re-route a vehicle to an updated destination, computer-executable navigation control instructions may be sent to the relevant vehicle and the vehicle's ECU may execute the instructions to control operation of the vehicle and re-route the vehicle to the updated destination.

Previously, control of vehicle fleets involved communicating via radio with human drivers to update the destination based on often stale information. However, advances in driverless technology and in the ability to generate and send real-time state information about vehicle contents, site-specific load, site-specific inventory, geolocation, and/or other state data, provide an ability to control a fleet of autonomous and/or semi-autonomous vehicles in an optimized way that improves the operability and capability of such fleets and the delivery and processing systems that they support. Additionally, optimizing fleets of vehicles using the various techniques described herein may achieve environmental benefits that may reduce carbon emissions, traffic congestion, and delivery time of items. For example, re-routing a vehicle carrying an item to a site that is low on inventory of the item may initially result in a longer travel time to reach the updated destination. However, provisioning the item at the updated destination may ultimately reduce carbon footprint and delivery time as the item may be locally sourced in the future.

In some cases, the decision logic used by the remote server to dynamically determine a re-route (e.g., while a vehicle is already in route to a first destination) may include evaluating decision tree logic. However, in some other examples, machine learning techniques may be used to dynamically update vehicle routing based on current state data. For example, state data describing geolocation data, vehicle inventory, site inventory, predicted processing time at one or more sites, projected site inventory at projected arrival time, projected item demand, etc., may be encoded into state embedding data and input into a trained machine learning model (e.g., a neural network, feed forward network, logistic regression model, etc.) and used to predict whether to re-route the vehicle and/or to which new destination to re-route the vehicle.

Machine learning techniques, such as those described herein, are often used to form predictions, solve problems, recognize objects in image data for classification, etc. For example, herein machine learning techniques may be used to determine whether and/or where to re-route a vehicle. In various examples, machine learning models may perform better than rule-based systems and may be more adaptable as machine learning models may be improved over time by retraining the models as more and more data becomes available. Accordingly, machine learning techniques are often adaptive to changing conditions. Deep learning algorithms, such as neural networks, are often used to detect patterns in data and/or perform tasks.

Generally, in machine learned models, such as neural networks, parameters control activations in neurons (or nodes) within layers of the machine learned models. The weighted sum of activations of each neuron in a preceding layer may be input to an activation function (e.g., a sigmoid function, a rectified linear units (ReLu) function, etc.). The result determines the activation of a neuron in a subsequent layer. In addition, a bias value can be used to shift the output of the activation function to the left or right on the x-axis and thus may bias a neuron toward activation.

Generally, in machine learning models, such as neural networks, after initialization, annotated training data may be used to generate a cost or "loss" function that describes the difference between expected output of the machine learning model and actual output. The parameters (e.g., weights and/or biases) of the machine learning model may be updated to minimize (or maximize) the cost. For example, the machine learning model may use a gradient descent (or ascent) algorithm to incrementally adjust the weights to cause the most rapid decrease (or increase) to the output of the loss function. The method of updating the parameters of the machine learning model is often referred to as back propagation. Generally, in machine learning, an embedding is a mapping of a discrete, categorical variable to a vector of continuous numbers. In neural networks, embeddings are often of lower dimensions relative to the data that the embeddings represent.

Figure 1:
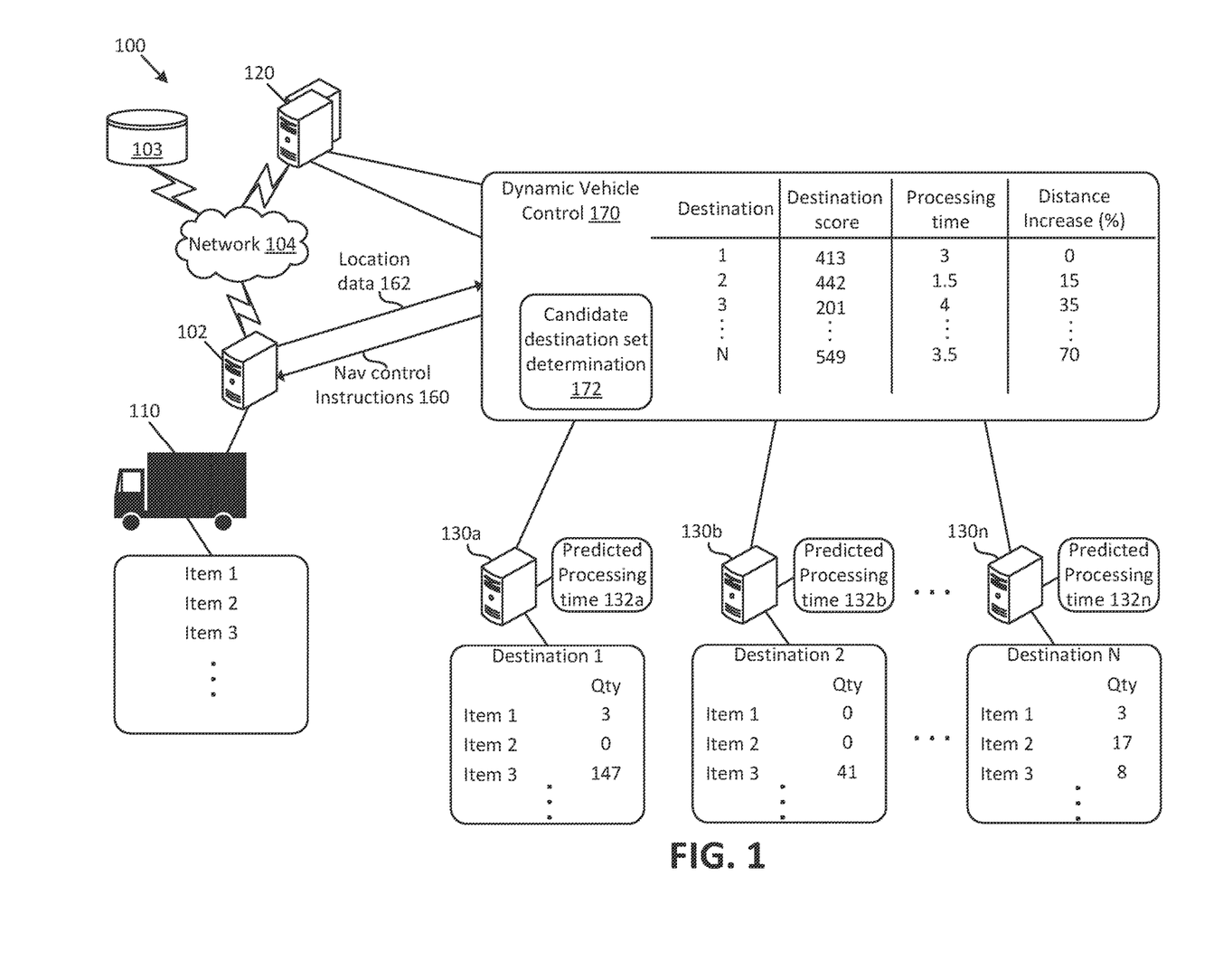
FIG. 1 is a block diagram depicting an example system effective to provide dynamic vehicle control, according to various embodiments of the present disclosure.

FIG. 1 is a block diagram depicting an example system 100 effective to provide dynamic vehicle control, according to various embodiments of the present disclosure. As depicted in FIG. 1, a vehicle may comprise one or more computing devices 102 (referred to hereinafter as "computing device 102"). Computing device 102 may comprise a vehicle ECU that may communicate with the various systems of the vehicle 110 (including navigation, climate control, autonomous vehicle control, safety functionality, entertainment systems, etc.). One or more of computing devices 120 may be configured to implement the dynamic vehicle control system 170 which may evaluate various data to determine whether to re-route vehicle 110 from a current destination to a different destination (e.g., among destinations 1, 2, . . . , N).

As previously described, in some examples, a machine learning model (e.g., a neural network) may be trained and instantiated by the dynamic vehicle control system 170 to predict a particular re-route destination. However, in the example of FIG. 1, computer decision logic is described that may determine whether to re-route and to which destination to re-route, in real time, as the vehicle 110 is currently in route to some destination. The computing devices 120 implementing the dynamic vehicle control system 170 may communicate with the ECU of the vehicle 110 over a network 104 (e.g., a wide area network (WAN) such as the Internet). Vehicle 110 and/or computing device 102 implementing the ECU may comprise a wireless network interface to enable wireless communications. In some examples, the computing device 102 may include a display and/or a voice controlled interface. In some examples, computing device 102 implementing the ECU may comprise a cellular data receiver such that the vehicle 110 may receive control instructions from the dynamic vehicle control system 170 when a network connection to network 104 is unavailable. Alternatively, network 104 may represent a combination of a WAN and a cellular network effective to establish communication between the computing device 102, computing devices 120, and/or non-transitory computer-readable memory 103. The non-transitory computer-readable memory 103 may store computer-executable instructions that, when executed by at least one processor, may be effective to perform the various techniques (e.g., the decision logic) described herein.

The ECU of the vehicle 110 (implemented by computing device 102) may be initialized with an initial destination when departing from a source site (e.g., after receiving cargo comprising Item 1, Item 2, Item 3, etc. State data representing the items carried by vehicle 110 (and/or by one or more containers carried by vehicle 110) may be provided to the dynamic vehicle control system 170. This data may be compiled when vehicle 110 is loaded, for example. It should be noted that while the decision logic described in reference to FIG. 1 is described at the level of vehicle 110, the logic may instead by employed at a container level (e.g., a container carried by the vehicle 110 or another vehicle and including a manifest of one or more items).

Navigation control instructions 160 may initially be provided from the dynamic vehicle control system 170 to the ECU of vehicle 110 that may control the vehicle 110 (and/or a navigation system of the vehicle 110) to navigate to an original destination (e.g., Destination 1). While vehicle 110 is navigating to Destination 1, the dynamic vehicle control system 170 may continually, periodically, or semi-periodically evaluate decision logic (or perform inference using machine learning techniques) to determine whether a re-route to a different destination should occur. An example of such decision logic is described below.

The ECU of vehicle 110 may provide location data 162 (e.g., geolocation data) that specifies a current location of the vehicle 110. This location data 162 may be provided on a continuous basis as the vehicle 110 is in route to its destination. The dynamic vehicle control system 170 may receive the location data 162 and may determine a set of candidate destinations for a potential re-route of the vehicle 110. In some examples, the set of candidate destinations may be all potential destinations (e.g., all enterprise sites that process cargo loads carried by the vehicle 110) within a threshold distance of the current location of vehicle 110, as determined from location data 162. For example, candidate destination set determination 172 may determine all candidate sites for delivery of the load of vehicle 110 within a threshold distance of the current location of vehicle 110. The threshold distance may be based on a predefined radius (e.g., 250 mile radius) and/or based on a distance to travel via roadways (e.g., 200 miles away or less).

In the example of FIG. 1, the set of candidate destinations may include the current destination (e.g., Destination 1) as well as candidate Destinations 2, 3, ..., N). For each candidate destination, including the current destination (Destination 1), a Destination score may be computed. In some examples, the Destination score may be computed based on the items in the vehicle 110 and based on the current or projected amount of these same items at the respective candidate destinations.

As an example, let it be assumed that vehicle 110 carries Item 1, Item 2, and Item 3. A first check may be performed by dynamic vehicle control system 170 to determine if Destination 1 has Item 1 and to determine the number of units of Item 1 present at Destination 1. The number of items may be the current number available or may be the projected number of units at a time at which vehicle 110 is projected to arrive at the destination (depending on the implementation). In the example, if Destination 1 does not have any units of Item 1, a maximum value may be added to a score for the vehicle 110—Destination 1 pairing. For example, a step function may be used to determine the amount of score to add based on the quantity of units of the relevant item. For example, if Destination 1 does not have any units, 10 points may be added to the destination score for Destination 1. If Destination 1 has some units, but less than a first threshold number of units, a second, lesser amount of points may be added to Destination 1's score, and if Destination 1 has greater than a high threshold amount of points, 0 points may be added to Destination 1's score. It should be noted that the number of thresholds (and thus the number of "bins") and/or the value of the thresholds may be tunable depending on the desired implementation. This same process may be repeated for each item carried by vehicle 110 (e.g., for Item 1, Item 2, and Item 3) and the scores may be added together. Additionally, this process may be repeated for each candidate destination (e.g., Destinations 1, 2, 3, ..., N).

For example, a low quantity threshold may be 5 units for Item 1. Destination 1 may have 3 units of Item 1, Destination 2 may have 0 units of Item 1, and Destination N may have 3 units of Item 1. Accordingly, using the example scoring logic described above, Destination 1 and Destination 3 have greater than 0, but less than the low threshold of 5 units. Accordingly, Destination 1 and Destination 3 may each receive 2 points for their destination score for the vehicle 110 (or for the particular container of vehicle 110). However, Destination 2 has 0 units of Item 1 and thus receives a higher score for Item 1 (e.g., 5 points). In another example, Destination 1 may have 147 units of Item 3, Destination 2 may have 41 units of Item 3, and Destination N may have 8 units of Item 3. In this example, the low threshold may be 10 units. Destination 1 may receive 0 additional points for Item 3 since it currently has 147 units (greater than the 10 unit low threshold). Similarly, Destination 2 may receive 0 additional points since it has 41 units. However, Destination N may receive 2 additional points as it has 8 units, which is less than the low threshold of 10 units for Item 3.

In the example of FIG. 1, Destination 1 has a destination score of 413, Destination 2 has a destination score of 442, Destination 3 has a destination score of 201, and so on. The destination scores may be accumulated across all items carried by the vehicle 110 for each candidate destination. The candidate destinations may be ranked based on the scores (e.g., with the highest scores being ranked higher relative to the lower scores). It should be appreciated that instead the lowest scores could be ranked highest and the step function could award lower points for sites with low inventory vs. high inventory, depending on the implementation. Additionally, different thresholds and/or different point values may be associated with different items or categories of items, depending on the implementation.

The dynamic vehicle control system 170 may also determine, based on the location data 162 the approximate arrival time of vehicle 110 at each of the candidate destinations. In various examples, the approximate arrival time may be based on prevailing traffic conditions along the travel route to the candidate destination. Upon determining the projected arrival time for each candidate destination, the dynamic vehicle control system 170 may project the processing time at each candidate destination. The predicted processing time may be expressed in terms of a number of days and may represent the number of days (including fractions of days) that are expected to elapse between a vehicle's arrival and the processing of the load of that vehicle. The predicted processing time may be calculated based on a variety of factors. For example, the number of available docks, the projected personnel available at the projected arrival time, the projected number of other arrivals at or near the projected arrival time, etc.

In at least some examples, computing devices 130*a*, 130*b*, ..., 130*n* may determine the destination-specific predicted processing times 132*a*, 132*b*, ..., 132*n*. An example of predicted processing time (including Destination-specific predicted processing times 132*a*, 132*b*, ..., 132*n*) is described below. However, it should be appreciated that there may be other ways of calculating the predicted processing time (including machine learning approaches). Additionally, a different set of factors may be used to calculate the projected arrival time apart from what is described in the example below.

The predicted processing time may be forecasted using the current number of units (e.g., vehicles, containers, items, etc.) to be processed. In some examples, an average number of units to be transferred in to a destination site over a forthcoming time period (e.g., 7 days or some other time period) may be used. The predicted processing time may be based on the current size of the backlog at a destination site and the actual and forecasted number of units to be processed over the next X days (excluding the current day).

The forecasted End Transfer In backlog may be calculated using:

$$(t)/(\text{AVERAGE}(\text{forecasted\_transfer\_in\_receipts}: (t+1):(t+7)))$$

where t is the current day and the forecasted_transfer_in_receipts is the destination site's projected workforce to handle a transfer in receipt. The forecasted End Transfer In may represent the number of days that it will take the destination site to process the projected backlog on the predicted arrival day of the vehicle 110. The forecasted End Transfer In backlog may be the forecasted backlog based on Forecasted New Transfer In and Forecasted Transfer In receipts. The value may be negative, but may be set to 0 for the subsequent day's calculation.

Calculation: MAX(Forecasted End Transfer In Backlog)$(t-1)$,0)+ [Forecasted New Transfer In]−[Forecasted Transfer In Receipts].

It should be noted that the particular forecasting techniques used to predict the processing time on the arrival date may vary depending on the desired implementation. As previously described machine learning approaches may be used instead of, or in addition to, rule based implementations (such as the rule-based approach described above).

In the example of FIG. 1, Destination 1 (the current destination of vehicle 110) may have a predicted processing time (associated with the projected time of arrival of vehicle 110) of 3 days. Destination 2 may have a predicted processing time of 1.5 days; Destination 3 may have a predicted processing time of 4 days; and Destination N may have a predicted processing time of 3.5 days.

The candidate destinations for re-routing the vehicle 110 may be ranked in terms of the Destination score. However, those candidate Destinations with predicted processing times that are greater than the predicted processing time of the current destination may be pruned from consideration. For example, the candidate destinations in FIG. 1 may be ranked, based on Destination score, as follows: Destination N, Destination 2, Destination 1 (the current destination), Destination 3. However, the top-ranked candidate destination (Destination N) has a predicted processing time of 3.5, which exceeds the predicted processing time of the current destination (Destination 1, with a predicted processing time of 3). Accordingly, Destination N is pruned from consideration. Destination 2 may have the next-highest ranked Destination score (442). Additionally, the predicted processing time associated with Destination 2 may be less than the predicted processing time of the current destination. Specifically, candidate re-route Destination 2 has a predicted processing time of 1.5, while the current destination (Destination 1) has a predicted processing time of 3. Accordingly, the dynamic vehicle control system 170 may select Destination 2 for re-routing vehicle 110 and may send computer-executable navigation control instructions 160 to computing device 102 implementing the ECU of vehicle 110. The computer-executable navigation control instructions 160 may be effective to control the vehicle 110 (and/or a navigation system of the vehicle 110) to navigate the vehicle to the updated destination (Destination 2). Note that the computer-executable navigation control instructions 160 may be sent in real time, while the vehicle 110 is currently navigating to Destination 1. Since the state data may change and may be updated in real time, the routing decision may change as well. The state data may include the current or predicted Item inventory at each site, the set of candidate sites determined by the candidate destination set determination 172, the predicted processing time, etc. It should be noted that other units besides days (and/or besides time) may be used to represent the predicted processing of the different candidate destinations, depending on the implementation.

In some optional examples, other factors may be considered when determining the re-route decision by the dynamic vehicle control system 170. For example, the selected re-route destination may be required to be at or below a distance increase percentage. For example, the re-route may be required to not result in greater than a threshold increase to travel distance of the vehicle 110. In the example, the distance increase percentage for the current destination is 0% since that is the current destination of vehicle 110. However, traveling to Destination N instead of to Destination 1 may result in a 70% increase in travel distance for vehicle 110 based on the current location. This increase percentage may also be expressed in terms of cost (based on fuel costs, for example) and/or time in addition to, or instead of, distance. The percentage increase in travel distance may be determined using a ratio of the distance to the candidate destination and the distance to the current destination. The ratio may be compared to a threshold ratio to ensure that the percentage increase in travel distance does not exceed the threshold ratio.

For example, a threshold distance increase may be set at 25% (or any other desired value). There may be a Destination 4 with a higher Destination score than Destination 2 and with a processing time that is less than the current destination. However, traveling to Destination 4 may result in a 30% increase in distance, violating the distance threshold. Accordingly, in this example, Destination 4 may be pruned from consideration when selecting a re-route destination. A pruning operation may involve programmatically excluding the pruned candidate from further re-route consideration for the current evaluation. Pruned candidates may still be evaluated during subsequent evaluations, as the state data (including destinations scores, processing time, and distance increase (%), etc.) may be different.

In various examples, the logic for dynamically rerouting vehicles to different destination may be implemented differently apart from the examples previously described with respect to FIG. 1. For example, as previously discussed, the destination scores, state data, predicted processing time, etc., may be input into a machine learning model trained to determine a reroute destination. In other examples, instead of calculating a destination score and pruning candidates based on processing time exceeding the current destination, an equation may be used that determines an overall score for each candidate destination. For example, an example equation may be:

$$\text{score}_{destination\_i} = x^*\text{distance} + y^*\text{predicted processing time} + z^*\text{destination score}$$

where distance is the distance to a candidate destination and where predicted processing time and destination scores are calculated by dynamic vehicle control system 170, per destination, as described above. The coefficients x, y, and z may be used to weight the various terms. In various examples, predicted processing time may be more heavily weighted relative to distance and destination score. However, the weights may vary from implementation to implementation. In one example implementation, x=0.0148, y=3.2378, and z=0.0045 with an R-squared value of 0.869 (indicating a percentage of variance that can be explained using the model) and a probability F-statistic of 0.00179 (indicating the probability that the model does not explain the observations). However, other coefficients may be used according to the particular data observed and the desired implementation.

Figure 2:
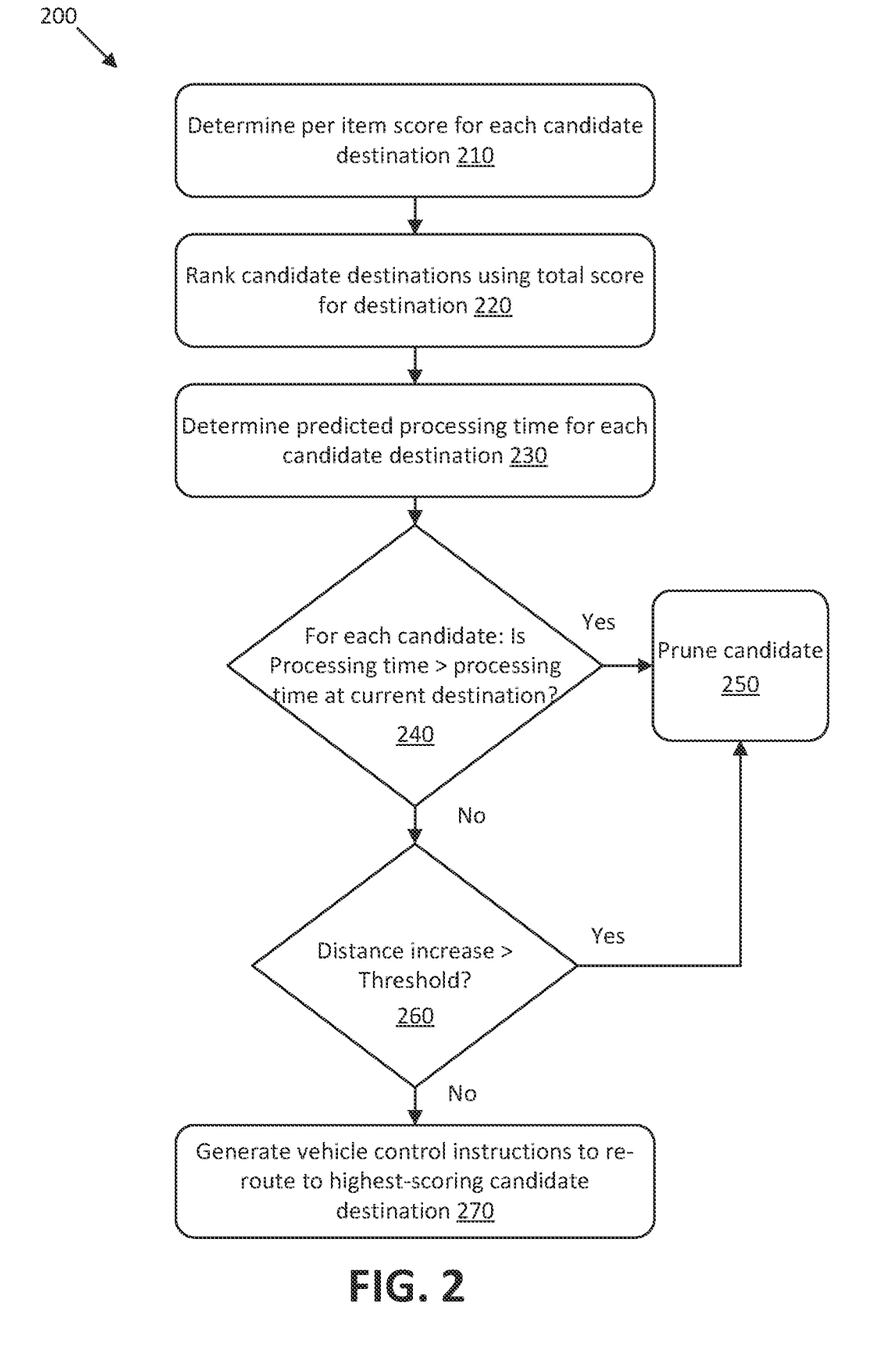
FIG. 2 depicts an example process for determining vehicle control instructions, in accordance with various aspects of the present disclosure.

FIG. 2 depicts an example process 200 for determining vehicle control instructions, in accordance with various aspects of the present disclosure. Those portions of FIG. 2 that have been previously discussed in reference to FIG. 1 may not be described again for purposes of clarity and brevity. The actions of the process 200 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Processing may begin at action 210, at which a per-item score for each candidate destination may be determined. For example, each item being carried by the relevant vehicle or container may be evaluated. For each item, a determination may be made of the number of units of that item available at each candidate destination. As described above, various thresholds may be used to determine an amount to add to a score for each candidate destination. In general, the lower the quantity of units of the relevant item at a candidate destination, the greater the amount that is added to the score for that candidate destination. The specific values of the thresholds and the specific scoring system depends on the desired implementation. In some examples, the thresholds and/or scoring may be specific to the particular item and/or category of item. In some examples, the scoring and/or thresholds may be tailored to the particular candidate destination. For example, a candidate destination that is servicing a high population geographic area may have higher item quantity thresholds relative to a candidate destination serving a less populated area.

Processing may continue at action 220, at which the candidate destinations may be ranked using the total score for each candidate destination. The total score may be determined by adding the scores for each item being carried by the vehicle/container (as determined as described above) for each candidate destination to determine a total score. In various examples, the candidate destinations may be ranked in descending order of total score with higher scores being preferred for re-routing over lower scores. However, it should be noted that in different implementations lower scores may be preferred.

Processing may continue at action 230 at which a predicted processing time may be determined for each candidate destination. The predicted processing time may represent the predicted time needed to process the items in a newly-arrived vehicle at the time at which the current vehicle is projected to arrive at the destination. The predicted processing time may be estimated based on current processing load, future processing load, estimated workforce at the projected arrival time, etc. Future processing load may be estimated based on location data provided from other vehicles and/or from current load levels. An example implementation of calculating the predicted processing time is described above in reference to FIG. 1.

At action 240, a determination may be made for each candidate destination whether the predicted processing time is greater than the processing time at the current destination. If so, the candidate destination may be pruned from consideration at action 250. Optionally, at action 260, a determination may be made whether any increase in distance traveled due to the re-routing to a particular candidate exceeds a distance increase threshold. For example, if the distance to the candidate destination is greater than a 30% increase over the distance to the current destination the candidate destination may be pruned (action 250). If not, processing may continue to action 270, at which vehicle control instructions may be generated that may be effective to re-route the vehicle to the highest-scoring candidate destination (e.g., the highest scoring candidate that has not been pruned). The vehicle control instructions may be in a native instruction set architecture to the vehicle ECU. Accordingly, upon receipt of the vehicle control instructions, at least one processor of the vehicle ECU may be effective to execute the vehicle control instructions which may result in the vehicle being re-routed to the selected candidate destination.

Figure 3:
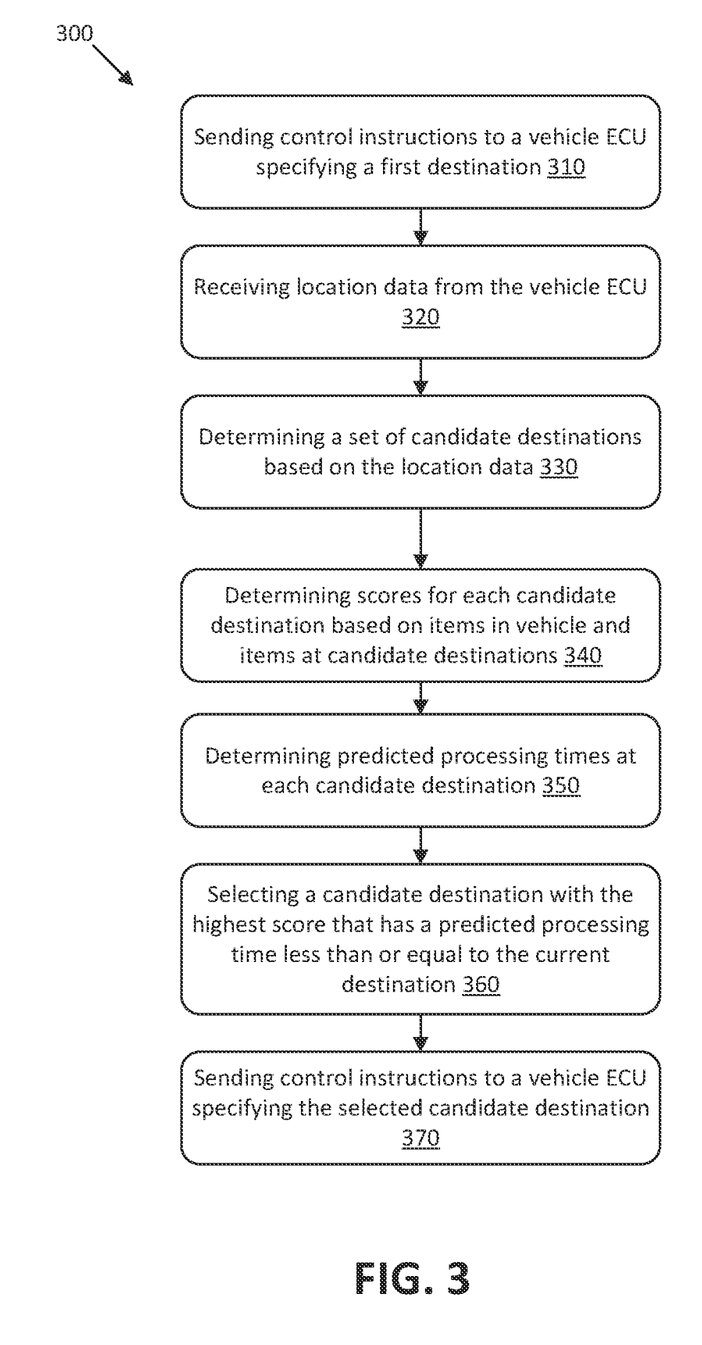
FIG. 3 depicts an example process for determining a candidate destination and sending control instructions to a vehicle, in accordance with various aspects of the present disclosure.

FIG. 3 depicts an example process 300 for determining a candidate destination and sending control instructions to a vehicle, in accordance with various aspects of the present disclosure. Those portions of FIG. 3 that have been previously discussed in reference to FIGS. 1 and 2 may not be described again for purposes of clarity and brevity. The actions of the process 300 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Processing may begin at action 310, at which control instructions may be sent to a vehicle ECU. The control instructions may specify a first destination for the vehicle. The vehicle ECU may execute the control instructions that may be effective to control a navigation system of the vehicle to route the vehicle to the first destination. Accordingly, the vehicle may begin navigating to the first destination.

Processing may continue at action 320, at which location data may be received from the vehicle ECU. The location data may be sent to the dynamic vehicle control system 170 of FIG. 1 (e.g., periodically). The location data may comprise geolocation coordinates of the vehicle.

Processing may continue at action 330, at which a set of candidate destinations may be determined based on the location data. For example, the dynamic vehicle control system 170 may determine all available candidate destinations that are within a threshold distance of the most recently received location data of the vehicle. The threshold distance may be a circle defined by a radius from the current location of the vehicle or may be determined based on a shortest travel distance (e.g., via roadway) from a current location of the vehicle to the candidate locations.

Processing may continue at action 340, at which scores for each candidate location may be determined based on items in the vehicle and a quantity of those items present at the candidate destinations. For example, for a first candidate destination, a first item that is on the vehicle may be evaluated. The quantity of the first item that is present at the candidate destination may be determined and compared to one or more thresholds. Depending on the relative quantity of the first item at the first candidate destination, a score value may be added to a score for the first candidate destination. This process may be repeated for each item on the vehicle and the score may accumulate for the first candidate destination. This process may be repeated for each of the candidate destinations until a single score value is computed for each candidate destination (for the current vehicle load).

Processing may continue at action 350, at which predicted processing times may be determined at each candidate destination. The predicted processing time may represent the predicted time needed to process the items in a newly-arrived vehicle at the time at which the current vehicle is projected to arrive at the relevant candidate destination. The predicted processing time may be estimated based on current processing load, future processing load, estimated workforce at the projected arrival time, etc. Future processing load may be estimated based on location data provided from other vehicles and/or from current load levels. An example implementation of calculating the predicted processing time is described above in reference to FIG. 1.

Processing may continue at action 360, at which a candidate destination may be selected. The selected candidate destination may be the candidate destination with the highest score and which also has a predicted processing time that is less than or equal to the predicted processing time at the current destination. Processing may continue at action 370, at which computer-executable control instructions may be generated that may be effective to re-route the vehicle to the highest-scoring candidate destination that has a predicted processing time less than or equal to the current destination. The vehicle control instructions may be in a native instruction set architecture to the vehicle ECU. Accordingly, upon receipt of the vehicle control instructions, at least one processor of the vehicle ECU may be effective to execute the vehicle control instructions, which may result in the vehicle being re-routed to the selected candidate destination.

Figure 4:
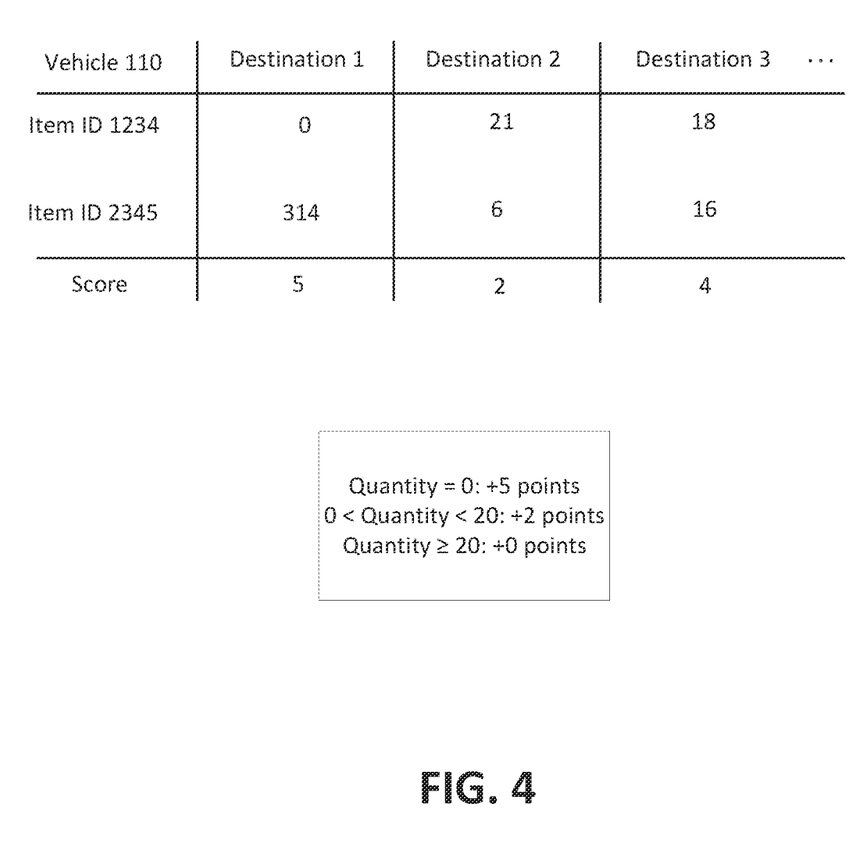
FIG. 4 depicts an example of vehicle-candidate destination score calculation, in accordance with various aspects of the present disclosure.

FIG. 4 depicts an example of vehicle-candidate destination score calculation, in accordance with various aspects of the present disclosure. The example in FIG. 4 is simplistic in that only 2 item IDs are evaluated and is used only to show one possible example of score calculation for vehicle-candidate destination pairs. As previously described, the score calculation may instead be performed for containers (e.g., shipping crates) or other units of items paired with the candidate destinations. In general, any number of items and candidate destinations may be evaluated.

In the example of FIG. 4, if a particular candidate destination has 0 units of an item that is on vehicle 110 (e.g., item ID 1234 or item ID 2345) that candidate destination receives+5 points to its total score for purposes of selecting a re-route destination (as described above in reference to FIG. 1). In the example of FIG. 4, if a particular candidate destination has greater than 0, but less than 20 units of an item that is on vehicle 110, that candidate destination receives +2 points to its total score, and if the candidate destination has greater than or equal to 20 units of the item that is on vehicle 110, that candidate destination receives 0 points added to its score.

It should be appreciated that the number of thresholds and the values of the thresholds may depend on the particular implementation. In general, the thresholds may be expressed as a step function where the score added is inversely proportional to the quantity of the item at the candidate destination. In another example, the thresholds may be: quantity <5: +10 points, quantity 5-100: +5 points, quantity 101-200: +1 point, quantity >200: +0 points. Additionally, as previously described, the particular thresholds may be different for different items and/or for different candidate destinations. Additionally, the point values may be different for different items and/or for different candidate destinations.

In the example of FIG. 4, vehicle 110 includes only two types of items: Item ID 1234 and Item ID 2345. Destination 1 has 0 of Item 1234. Accordingly, Destination 1 receives a +5 points. Destination 1 has 314 units of Item ID 2345 and accordingly receives+0 points for a total of 5 points. Destination 2 has 21 of Item ID 1234 (+0 points) and 6 of Item ID 2345 (+2 points) for a total of 2 points. Destination 3 has 18 of Item ID 1234 (+2 points) and 16 of Item ID 2345 (+2 points) for a total of 4 points. Accordingly, the three candidate destinations may be ranked in descending order of score for purposes of candidate selection: Destination 1 (5 points), Destination 3 (4 points), Destination 2 (2 points), and so on. Various candidate destinations may be pruned for consideration for re-routing of vehicle 110 based on predicted backlog and/or predicted distance increase relative to the current destination, as previously described.

Figure 5:
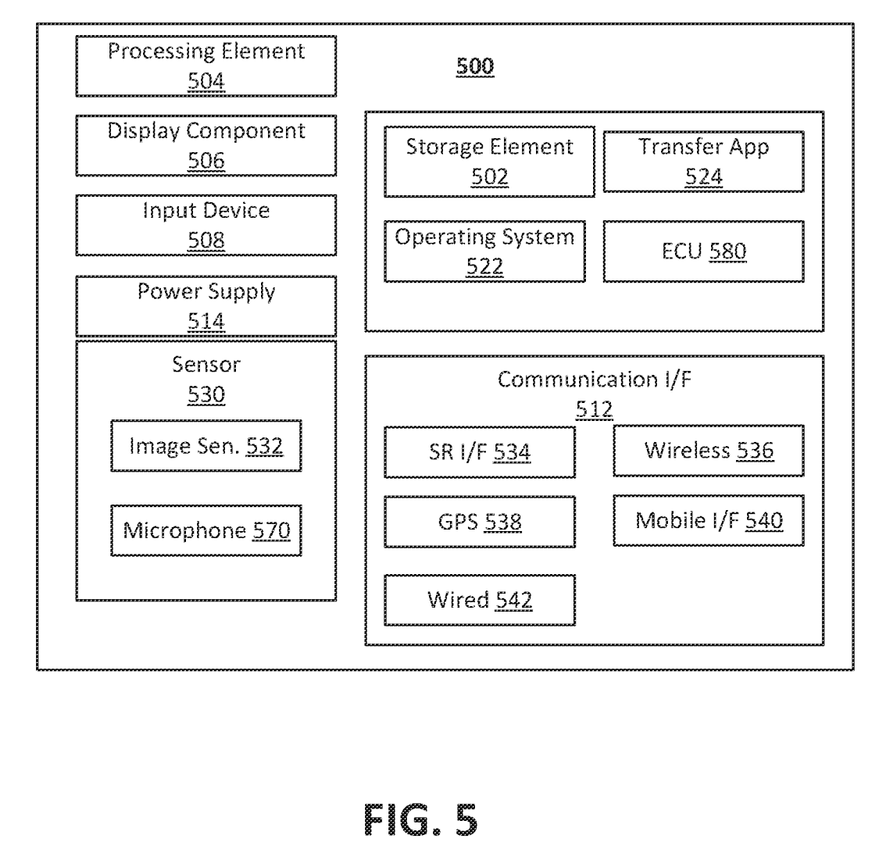
FIG. 5 is a block diagram showing an example architecture of a computing device that may be used in accordance with various embodiments described herein.

FIG. 5 is a block diagram showing an example architecture 500 of a computing device that may be used to receive the computer-executable navigation control instructions, in accordance with various aspects of the present disclosure. In various examples, the architecture 500 may be deployed on vehicle 110 and/or may be used to implement dynamic vehicle control 170. It will be appreciated that not all devices will include all of the components of the architecture 500 and some user devices may include additional components not shown in the architecture 500. The architecture 500 may include one or more processing elements 504 for executing instructions and retrieving data stored in a storage element 502. The processing element 504 may comprise at least one processor. Any suitable processor or processors may be used. For example, the processing element 504 may comprise one or more digital signal processors (DSPs). The storage element 502 can include one or more different types of memory, data storage, or computer-readable storage media devoted to different purposes within the architecture 500. For example, the storage element 502 may comprise flash memory, random-access memory, disk-based storage, etc. Different portions of the storage element 502, for example, may be used for program instructions for execution by the processing element 504, storage of images or other digital works, and/or a removable storage for transferring data to other devices, etc. Additionally, storage element 502 may store parameters, and/or machine learning models generated using the various techniques described herein.

The storage element 502 may also store software for execution by the processing element 504. An operating system 522 may provide the user with an interface for operating the computing device and may facilitate communications and commands between applications executing on the architecture 500 and various hardware thereof. A transfer application 524 may be configured to receive images, audio, and/or video from another device (e.g., a mobile device, image capture device, and/or display device) or from an image sensor 532 and/or microphone 570 included in the architecture 500.

Architecture 500 may include an ECU 580—an embedded system in an autonomous vehicle effective to control one or more electrical systems or subsystems in the vehicle. ECU 580 may comprise an engine control module effective to control the engine of vehicle 110, a powertrain control module (PCM), a transmission control module (TCM), a brake control module, a central control module, a central timing module, a general electronic module, a body control module, a suspension control module, and/or one or more artificial intelligence modules effective to autonomously control operation and/or navigation of the vehicle (e.g., using input from a sensor suite included on the vehicle including cameras, computer vision modules, Lidar, radar, and/or other sensors).

When implemented in some user devices, the architecture 500 may also comprise a display component 506. The display component 506 may comprise one or more light-emitting diodes (LEDs) or other suitable display lamps. Also, in some examples, the display component 506 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 506 may be effective to display the various fields and/or GUIs described herein.

The architecture 500 may also include one or more input devices 508 operable to receive inputs from a user. The input devices 508 can include, for example, a push button, touch pad, touch screen, vehicle control interface, wheel, joystick, keyboard, mouse, trackball, keypad, light gun, game controller, or any other such device or element whereby a user can provide inputs to the architecture 500. These input devices 508 may be incorporated into the architecture 500 or operably coupled to the architecture 500 via wired or wireless interface. In some examples, architecture 500 may include a microphone 570 or an array of microphones for capturing sounds, such as voice requests. In various examples, audio captured by microphone 570 may be streamed to external computing devices via communication interface 512.

When the display component 506 includes a touch-sensitive display, the input devices 508 can include a touch sensor that operates in conjunction with the display component 506 to permit users to interact with the image displayed by the display component 506 using touch inputs (e.g., with a finger or stylus). The architecture 500 may also include a power supply 514, such as a wired alternating current (AC) converter, a rechargeable battery operable to be recharged through conventional plug-in approaches, or through other approaches such as capacitive or inductive charging.

The communication interface 512 may comprise one or more wired or wireless components operable to communicate with one or more other computing devices. For example, the communication interface 512 may comprise a wireless communication module 536 configured to communicate on a network, such as the network 104, according to any suitable wireless protocol, such as IEEE 802.11 or another suitable wireless local area network (WLAN) protocol. A short range interface 534 may be configured to communicate using one or more short range wireless protocols such as, for example, near field communications (NFC), Bluetooth, Bluetooth LE, etc. A mobile interface 540 may be configured to communicate utilizing a cellular or other mobile protocol. A Global Positioning System (GPS) interface 538 may be in communication with one or more earth-orbiting satellites or other suitable position-determining systems to identify a position of the architecture 500. A wired communication module 542 may be configured to communicate according to the USB protocol or any other suitable protocol.

The architecture 500 may also include one or more sensors 530 such as, for example, one or more position sensors, image sensors, and/or motion sensors. The sensors 530 may be configured in communication with the vehicle ECU 580. An image sensor 532 is shown in FIG. 5. Some examples of the architecture 500 may include multiple image sensors 532. For example, a panoramic camera system may comprise multiple image sensors 532 resulting in multiple images and/or video frames that may be stitched and may be blended to form a seamless panoramic output. An example of an image sensor 532 may be a camera configured to capture color information, image geometry information, and/or ambient light information.

As noted above, multiple devices may be employed in a single system. In such a multi-device system, each of the devices may include different components for performing different aspects of the system's processing. The multiple devices may include overlapping components. The components of the computing devices, as described herein, are exemplary, and may be located as a stand-alone device or may be included, in whole or in part, as a component of a larger device or system.

Figure 6:
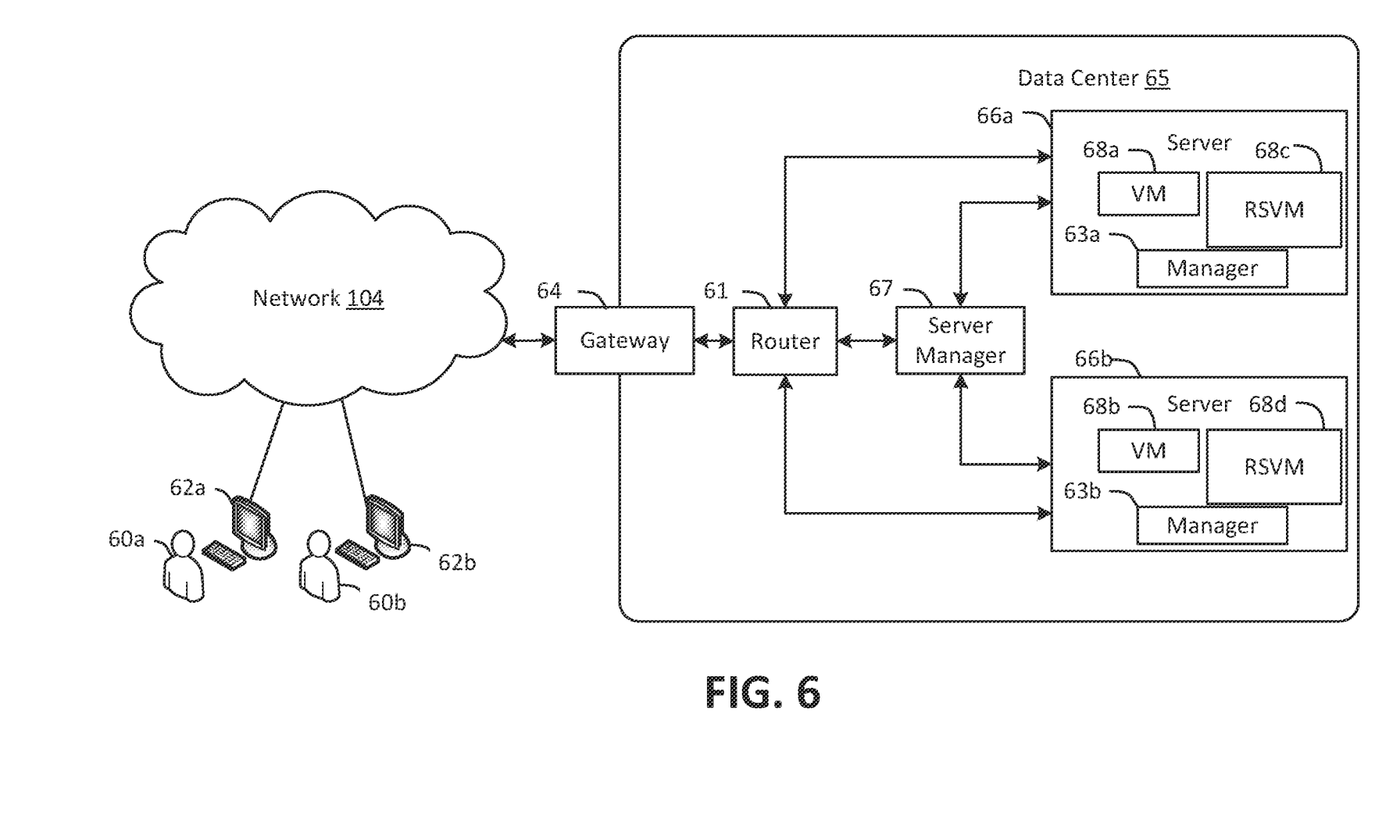
FIG. 6 is a diagram illustrating an example system for sending and providing data that may be used in accordance with the present disclosure.

An example system for sending and providing data will now be described in detail. In particular, FIG. 6 illustrates an example computing environment in which the embodiments described herein may be implemented. For example, the computing environment of FIG. 6 may be used to provide the various machine learning models and/or the dynamic vehicle control 170 described herein as a service over a network wherein one or more of the techniques described herein may be requested by a first computing device and may be performed by a different computing device configured in communication with the first computing device over a network. FIG. 6 is a diagram schematically illustrating an example of a data center 65 that can provide computing resources to users 60a and 60b (which may be referred herein singularly as user 60 or in the plural as users 60) via user computers 62a and 62b (which may be referred herein singularly as user computer 62 or in the plural as user computers 62) via network 104. Data center 65 may be configured to provide computing resources for executing applications on a permanent or an as-needed basis. The computing resources provided by data center 65 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services, and the like. In various examples, the instances may be configured to execute one or more of the various machine learning techniques described herein.

These services may be configurable with set or custom applications and may be configurable in size, execution, cost, latency, type, duration, accessibility, and in any other dimension. These web services may be configured as available infrastructure for one or more clients and can include one or more applications configured as a system or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources-consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 65 may include servers 66a and 66b (which may be referred herein singularly as server 66 or in the plural as servers 66) that provide computing resources. These resources may be available as bare metal resources or as virtual machine instances 68a-d (which may be referred herein singularly as virtual machine instance 68 or in the plural as virtual machine instances 68). In at least some examples, server manager 67 may control operation of and/or maintain servers 66. Virtual machine instances 68c and 68d are rendition switching virtual machine ("RSVM") instances. The RSVM virtual machine instances 68c and 68d may be configured to perform all, or any portion, of the techniques for improved rendition switching and/or any other of the disclosed techniques in accordance with the present disclosure and described in detail above. As should be appreciated, while the particular example illustrated in FIG. 6 includes one RSVM virtual machine in each server, this is merely an example. A server may include more than one RSVM virtual machine or may not include any RSVM virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 6, network 104 may, for example, be a publicly accessible network of linked networks and possibly operated by various distinct parties, such as the Internet. In other embodiments, network 104 may be a private network, such as a corporate or university network that is wholly or partially inaccessible to non-privileged users. In still other embodiments, network 104 may include one or more private networks with access to and/or from the Internet.

Network 104 may provide access to user computers 62. User computers 62 may be computers utilized by users 60 or other customers of data center 65. For instance, user computer 62a or 62b may be a server, a desktop or laptop personal computer, a tablet computer, a wireless telephone, a personal digital assistant (PDA), an e-book reader, a game console, a set-top box, or any other computing device capable of accessing data center 65. User computer 62a or 62b may connect directly to the Internet (e.g., via a cable modem or a Digital Subscriber Line (DSL)). Although only two user computers 62a and 62b are depicted, it should be appreciated that there may be multiple user computers.

User computers 62 may also be utilized to configure aspects of the computing resources provided by data center 65. In this regard, data center 65 might provide a gateway or web interface through which aspects of its operation may be configured through the use of a web browser application program executing on user computer 62. Alternately, a stand-alone application program executing on user computer 62 might access an application programming interface (API) exposed by data center 65 for performing the configuration operations. Other mechanisms for configuring the operation of various web services available at data center 65 might also be utilized.

Servers 66 shown in FIG. 6 may be servers configured appropriately for providing the computing resources described above and may provide computing resources for executing one or more web services and/or applications. In one embodiment, the computing resources may be virtual machine instances 68. In the example of virtual machine instances, each of the servers 66 may be configured to execute an instance manager 63a or 63b (which may be referred herein singularly as instance manager 63 or in the plural as instance managers 63) capable of executing the virtual machine instances 68. The instance managers 63 may be a virtual machine monitor (VMM) or another type of program configured to enable the execution of virtual machine instances 68 on server 66, for example. As discussed above, each of the virtual machine instances 68 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 65 shown in FIG. 6, a router 61 may be utilized to interconnect the servers 66a and 66b. Router 61 may also be connected to gateway 64, which is connected to network 104. Router 61 may be connected to one or more load balancers, and alone or in combination may manage communications within networks in data center 65, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 65 shown in FIG. 6, a data center 65 is also employed, at least in part, to direct various communications to, from, and/or between servers 66a and 66b. While FIG. 6 depicts router 61 positioned between gateway 64 and data center 65, this is merely an exemplary configuration. In some cases, for example, data center 65 may be positioned between gateway 64 and router 61. Data center 65 may, in some cases, examine portions of incoming communications from user computers 62 to determine one or more appropriate servers 66 to receive and/or process the incoming communications. Data center 65 may determine appropriate servers to receive and/or process the incoming communications based on factors such as an identity, location, or other attributes associated with user computers 62, a nature of a task with which the communications are associated, a priority of a task with which the communications are associated, a duration of a task with which the communications are associated, a size and/or estimated resource usage of a task with which the communications are associated and many other factors. Data center 65 may, for example, collect or otherwise have access to state information and other information associated with various tasks in order to, for example, assist in managing communications and other operations associated with such tasks.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 65 described in FIG. 6 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders), and various other consumer products that include appropriate communication capabilities.

Although various systems described herein may be embodied in software or code executed by general-purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. In addition, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the non-transitory, computer-readable medium and executed by the instruction execution system. In the context of the present disclosure, a "non-transitory computer-readable medium" can be any medium that can contain, store, or maintain the logic or application described herein for use by or in connection with the instruction execution system. The non-transitory computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A computer-implemented method of vehicle control, comprising:
    sending, at a first time, first computer-executable navigation control instructions, to an electronic control unit (ECU) of a vehicle, wherein the ECU processes the first computer-executable navigation control instructions to route the vehicle to a first destination;
    receiving first data representing a first predicted processing time associated with the first destination;
    determining, for a first item carried by the vehicle, a first number of units of the first item present at a first candidate destination;
    determining, for the first item, a second number of units of the first item present at a second candidate destination;
    determining a first score for the first candidate destination based on the first number of units;
    determining a second score for the second candidate destination based on the second number of units;
    determining a second predicted processing time associated with the first candidate destination;
    determining a third predicted processing time associated with the second candidate destination;

determining that the first score is a highest score among a set of candidate destinations comprising the first candidate destination and the second candidate destination;

determining that the second predicted processing time is greater than the first predicted processing time;

determining that the third predicted processing time is less than or equal to the first predicted processing time;

generating second computer-executable navigation control instructions effective to route the vehicle to the second candidate destination; and sending the second computer-executable navigation control instructions to the ECU at a second time while the vehicle is in route to the first destination, wherein the ECU processes the second computer-executable navigation control instructions to control the vehicle to the second candidate destination.

2. The method of claim 1, further comprising:
receiving first location data from the ECU of the vehicle indicating a first location of the vehicle;
determining a first distance associated with travel from the first location to a second location, wherein the second location is associated with the second candidate destination;
determining a second distance associated with travel from the first location to the first destination;
determining a ratio of the second distance to the first distance; and
determining that the ratio is less than a threshold ratio, wherein the second computer-executable navigation control instructions are generated based at least in part on the ratio being less than the threshold ratio.

3. The method of claim 1, further comprising:
receiving first location data from the ECU of the vehicle indicating a first location of the vehicle;
determining a first distance threshold; and
determining the set of candidate destinations based on each of the candidate destinations of the set of candidate destination being respective distances from the first location that are less than or equal to the first distance threshold.

4. A method of controlling a vehicle, comprising:
sending first computer-executable navigation control instructions, to an electronic control unit (ECU) of the vehicle, wherein the ECU processes the first computer-executable navigation control instructions to route the vehicle to a first destination;
determining, for a first item carried by the vehicle while the vehicle is in route to the first destination, a first number of units of the first item present at a second destination;
determining a first score for the second destination based at least in part on the first number of units;
determining, for the first item carried by the vehicle while the vehicle is in route to the second destination, a second number of units of the first item present at a third destination;
determining a second score for the third destination based at least in part on the second number of units;
selecting, while the vehicle is in route to the first destination, the third destination for re-routing the vehicle based at least in part on the first score and the second score;
generating second computer-executable navigation control instructions effective to re-route the vehicle from the first destination to the third destination; and sending the second computer-executable navigation control instructions to the ECU of the vehicle, wherein the ECU processes the second computer-executable navigation control instructions to control the vehicle to the third destination.

5. The method of claim 4, further comprising:
determining a first predicted processing time associated with the first destination;
determining a second predicted processing time associated with the second destination; and
determining a third predicted processing time associated with the third destination, wherein the third destination is selected for re-routing the vehicle further based at least in part on the second predicted processing time being greater than the first predicted processing time and the third predicted processing time being less than or equal to the first predicted processing time.

6. The method of claim 5, further comprising determining that the first score for the second destination is greater than the second score for the third destination.

7. The method of claim 5, wherein the first predicted processing time is associated with a time at which the vehicle is expected to arrive at the first destination based on a current location of the vehicle.

8. The method of claim 4, further comprising:
receiving first location data from the ECU of the vehicle indicating a first location of the vehicle;
determining a first distance threshold; and
determining a set of candidate destinations that are less than or equal to the first distance threshold from the first location of the vehicle, wherein the second destination and the third destination are among the set of candidate destinations.

9. The method of claim 4, further comprising:
receiving first location data from the ECU of the vehicle indicating a first location of the vehicle;
determining a first distance associated with travel from the first location to the first destination;
determining a second distance associated with travel from the first location to the third destination;
determining a first ratio of the second distance to the first distance; and
determining that the first ratio is less than a threshold ratio, wherein the second computer-executable navigation control instructions are generated based at least in part on the first ratio being less than the threshold ratio.

10. The method of claim 9, further comprising:
determining a third distance associated with travel from the first location to the second destination;
determining a second ratio of the third distance to the first distance; and
determining that the second ratio is greater than the threshold ratio, wherein the second computer-executable navigation control instructions are generated based at least in part on the second ratio being greater than the threshold ratio.

11. The method of claim 4, further comprising:
determining that the first number of units of the first item present at the second destination is zero;
adding a first amount to the first score based on the first number of units of the first item present at the second destination being zero;
determining that the second number of units of the first item present at the third destination is greater than zero and less than a low quantity threshold; and adding a second amount to the second score based on the second number of units of the first item present at the third destination being greater than zero and less than a low quantity threshold.

12. The method of claim 11, wherein the first amount is greater than the second amount.

13. The method of claim 11, further comprising:
determining that a third number of units of the first item present at a fourth destination is greater than zero and greater than the low quantity threshold; and
determining a third score for the fourth destination.

14. The method of claim 4, further comprising:
ranking a set of candidate destinations, while the vehicle is in route to the first destination, based on respective scores of each candidate destination of the set of candidate destinations; and
performing a pruning operation to remove candidate destinations from the set of candidate destinations that have predicted processing times greater than a predicted processing time of the first destination.

15. A system comprising:
at least one processor; and
non-transitory computer-readable memory storing instructions that, when executed by the at least one processor are effective to:
send first computer-executable navigation control instructions, to an electronic control unit (ECU) of a vehicle, wherein the ECU processes the first computer-executable navigation control instructions to route the vehicle to a first destination;
determine, for a first item carried by the vehicle while the vehicle is in route to the first destination, a first number of units of the first item present at a second destination;
determine a first score for the second destination based at least in part on the first number of units;
determine, for the first item carried by the vehicle while the vehicle is in route to the second destination, a second number of units of the first item present at a third destination;
determine a second score for the third destination based at least in part on the second number of units;
select, while the vehicle is in route to the first destination, the third destination for re-routing the vehicle based at least in part on the first score and the second score;
generate second computer-executable navigation control instructions effective to re-route the vehicle from the first destination to the third destination; and
send the second computer-executable navigation control instructions to the ECU of the vehicle, wherein the ECU processes the second computer-executable navigation control instructions to control the vehicle to the third destination.

16. The system of claim 15, the non-transitory computer-readable memory storing further instructions that, when executed by the at least one processor, are further effective to:
determine a first predicted processing time associated with the first destination;
determine a second predicted processing time associated with the second destination; and
determine a third predicted processing time associated with the third destination, wherein the third destination is selected for re-routing the vehicle further based at least in part on the second predicted processing time being greater than the first predicted processing time and the third predicted processing time being less than or equal to the first predicted processing time.

17. The system of claim 16, the non-transitory computer-readable memory storing further instructions that, when executed by the at least one processor, are further effective to determine that the first score for the second destination is greater than the second score for the third destination.

18. The system of claim 16, wherein the first predicted processing time is associated with a time at which the vehicle is expected to arrive at the first destination based on a current location of the vehicle.

19. The system of claim 15, the non-transitory computer-readable memory storing further instructions that, when executed by the at least one processor, are further effective to:
receive first location data from the ECU of the vehicle indicating a first location of the vehicle;
determine a first distance threshold; and
determine a set of candidate destinations that are less than or equal to the first distance threshold from the first location of the vehicle, wherein the second destination and the third destination are among the set of candidate destinations.

20. The system of claim 15, the non-transitory computer-readable memory storing further instructions that, when executed by the at least one processor, are further effective to:
receive first location data from the ECU of the vehicle indicating a first location of the vehicle;
determine a first distance associated with travel from the first location to the first destination;
determine a second distance associated with travel from the first location to the third destination;
determine a first ratio of the second distance to the first distance; and
determine that the first ratio is less than a threshold ratio, wherein the second computer-executable navigation control instructions are generated based at least in part on the first ratio being less than the threshold ratio.

* * * * *